United States Patent [19]
Rothert

[11] 3,987,021
[45] Oct. 19, 1976

[54] PROCESS UTILIZING A STIRRING REACTOR

[75] Inventor: Horst Rothert, Berlin, Germany

[73] Assignee: Karl Fischer Apparate u. Rohrleitungsbau, Berlin, Germany

[22] Filed: Oct. 22, 1975

[21] Appl. No.: 624,821

Related U.S. Application Data

[62] Division of Ser. No. 493,627, July 31, 1974, abandoned.

[30] Foreign Application Priority Data

Aug. 30, 1973 Germany............................ 2344117

[52] U.S. Cl. ............................... 260/95 R; 23/285; 260/695; 526/88
[51] Int. Cl.² ...................... C08F 2/02; C08G 85/00
[58] Field of Search............. 260/95 R, 695; 526/88

[56] References Cited
UNITED STATES PATENTS

| | | | |
|---|---|---|---|
| 3,057,702 | 10/1962 | Pierce et al. ...................... | 260/95 R |
| 3,174,830 | 3/1965 | Watzl et al. ............................. | 23/263 |
| 3,253,892 | 5/1966 | Brignac et al. .......................... | 23/285 |
| 3,320,639 | 5/1967 | Harp ........................................ | 18/30 |
| 3,373,186 | 3/1968 | Bachmann et al. ................... | 260/475 |
| 3,440,019 | 4/1969 | Albrecht et al. ....................... | 23/285 |
| 3,443,909 | 5/1969 | Goossens ........................ | 260/95 R |
| 3,498,754 | 3/1970 | Yamashita et al. .................... | 23/285 |
| 3,499,873 | 3/1970 | Kuehne et al. ..................... | 260/95 R |
| 3,684,458 | 8/1972 | McCammon et al. ................ | 23/285 |
| 3,709,664 | 1/1973 | Krekeler et al. ....................... | 23/285 |

FOREIGN PATENTS OR APPLICATIONS 17,248 11/1960 Japan

*Primary Examiner*—Alan Holler
*Attorney, Agent, or Firm*—Spencer & Kaye

[57] ABSTRACT

A process for polymerization or polycondensation wherein the reactor is equipped with a stirrer disposed in the interior of the reactor to be rotatable about an axis extending in the direction of the longitudinal axis of the interior of the reactor, the reactor also including inlet and discharge conduits for the reaction mass, a conduit for the removal of gaseous substances produced by evaporation during the reaction, and a heating device, and the reactor being mounted so that its longitudinal axis is inclined to the vertical so that the interior of the reactor defines a lower chamber which is to be filled with a liquid reaction mass and an upper chamber to be filled with vapors formed during the reaction, with the reaction mass discharge conduit being disposed at the lowest point of the fluid chamber and the stirrer being constructed so that its outermost parts which extend into the vapor chamber dip into the fluid chamber during each revolution of the stirrer.

4 Claims, 10 Drawing Figures

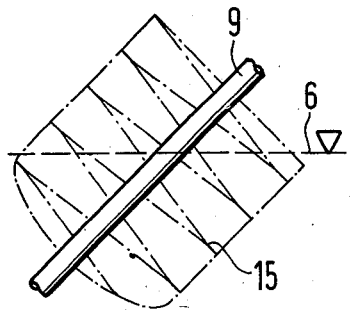
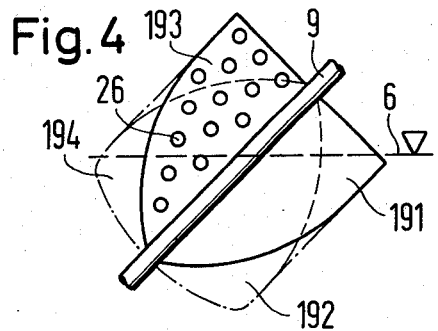
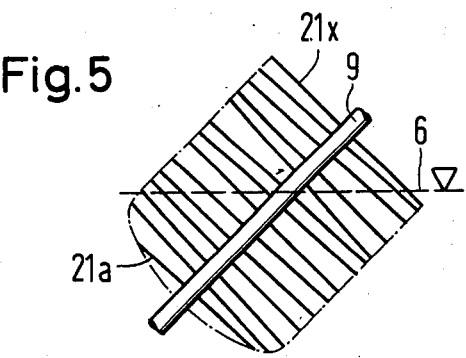
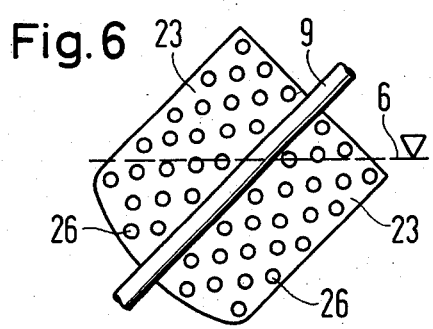
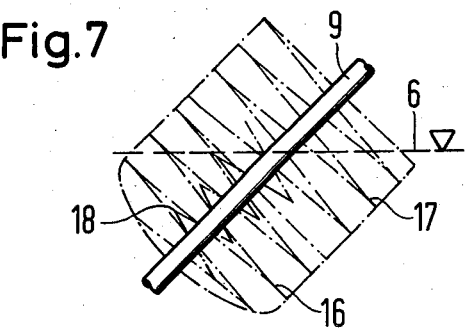
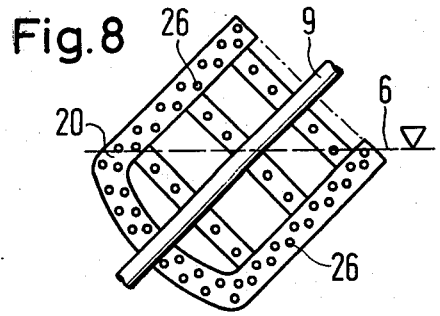
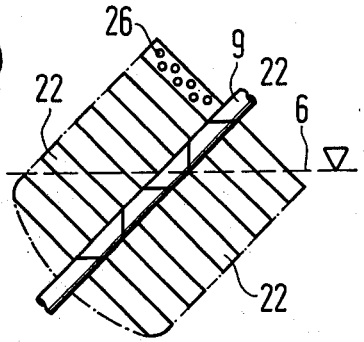
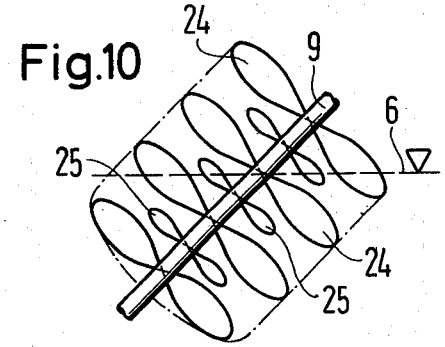

PROCESS UTILIZING A STIRRING REACTOR

CROSS-REFERENCE TO RELATED APPLICATION

This application is a division of application Ser. No. 493,627, filed July 31, 1974, now abandoned.

BACKGROUND OF THE INVENTION

The present invention relates to a reactor equipped with a stirrer, particularly a polymerization or polycondensation reactor wherein the stirrer is disposed in the interior of the reactor to be rotatable about an axis extending in the direction of the longitudinal axis of the interior, the reactor including an inlet conduit and a discharge conduit for the reaction mass, a conduit for removing gaseous substances evaporated during the reaction, and a heating device.

During polymerization, as well as during polycondensation, of monomer starting substances the volatile components of the reaction mass are evaporated under certain temperature and pressure conditions. Moreover, the reaction mass must be mixed continuously and must expose a large surface area to the reaction conditions so that a polymer of the desired quality will result. A polyamide or polyester produced in this manner is used, for example, for spun fibers or filaments.

German Published Patent Application No. 1,128,657 discloses an apparatus for the continuous polycondensation of diol esters of terephthalic acid which apparatus includes a heated reaction vessel which is slightly inclined with respect to the horizontal and which is divided into various chambers by means of weirs.

Stirrer wings, which are arranged on a shaft passing through the vessel, move within these chambers. During the manufacture of the polyester to be discharged the volatile components are conducted into a standing separating column which is in communication with the vapor chamber of the reaction vessel. The inclination of the reaction vessel serves merely to produce a defined conveying direction. The problems resulting during continuous production of polyester, for example, from the removal of the volatile components to be separated are to be easily controlled in this known arrangement with its almost horizontal arrangement of the reactor vessel and with the interior subdivided into the various chambers.

The Japanese Published Patent application No. 17,248/60 discloses a plurality of embodiments for thin layer evaporators for the continuous production of polycondensates. Here, too, the reaction mass is stirred. In the reactors, which may be arranged vertically as well as in an inclined position, again for the purpose of producing a defined conveying direction, the reaction mass is conveyed either over obliquie or horizontal surfaces or it flows along the interior walls of the reactor vessel while being uniformly spread out by stirring wings.

SUMMARY OF THE INVENTION

Based on the problems in the technology of the production of polyamides and polyesters, it is an object of the present invention to provide a reactor which is simple in structure, while having improved operating reliability, so that the polymers, which are later to be spun for example, can be produced in individual batches, are of excellent quality, and can be produced within a relatively short reaction time.

These and other objects according to the invention are achieved by having the longitudinal axis of the reactor inclined with respect to the vertical and by providing the interior of the reactor with an upper vapor chamber having a discharge conduit for the gaseous substances and a lower fluid chamber with a discharge conduit for the reaction mass at its lowest point, and by forming the stirrer so that its outermost parts which extend into the vapor chamber dip into the fluid chamber during each revolution.

The significant advantages of the present invention are the increase in the surface area of the reaction mass compared to that achieved with an exactly vertical arrangement of the reactor and a substantial improvement in the mixing of the reaction mass. Due to the conveying movement of the stirrer and the inclined position of the reactor, the individual particles of the reaction mass enter the gas chamber so frequently that the duration of the reaction is substantially shortened because of the faster evaporation of the volatile components.

The quiescent surface of the reaction mass in an inclined cylindrical reactor housing has the form of an ellipse whose area has the same ratio to a circular area with a radius of half the minor axis as does the major half axis to the minor half axis of the ellipse. In addition to this increase in surface area of the reaction mass, embodiments of the present invention cause a substantial quantity of the reaction mass to be lifted out of the fluid level by the parts of the stirrer which extend into the vapor chamber so that the total surface area available for evaporation is much larger than in a standing reactor with a stirrer moving in the reaction mass. The inclined position of the reactor according to the invention together with the stirrer which rotates in its interior and extends into the vapor chamber results in improved uniform mixing and faster transport of all particles of the reaction mass in the interior of the reactor because even with a simple design of the stirring member, this inclined position leads to advantageous asymmetrical and turbulent motion sequences.

The discharge conduit for the gaseous substances may be disposed at any desired point of the upper vapor chamber. However, for structural reasons and to better control the reaction conditions the area of the highest point in the vapor chamber is preferred. The reactor itself may include a cylindrical jacket portion and simple conventional bottoms. The arrangement of the discharge conduit at the lowest point of the fluid chamber is possible without technical difficulties and assures safe and clean emptying of the reactor for each batch.

Embodiments of reactors according to the invention may be provided with a double jacket through which a heat transfer medium flows and which serves as a heating device. This type of heating is known for horizontal as well as vertical reactors and has been found to be so satisfactory that no reason exists for providing a different type of heating in embodiments of the present invention unless there exists a positive requirement for a change.

Depending on the type of reaction mass employed and/or its percentage reaction, as well as on the dimensions of the reactor housing, it is advantageous to place the reactors of various embodiments of the present invention at different angles of inclination. Inclinations of the longitudinal axis of 10° to 80° with respect to the vertical are possible, i.e. almost anywhere between the vertical and horizontal position, an angle of inclination between 30° and 60° being preferred, however. Unless the reactor must be connected to stationary, rigid pipelines, the inclination can be changed during the production of one charge in order to produce the best surface area/volume relationships possible. An arrangement of the reactor for enabling the angle of inclination to be varied is more complicated from a structural point of view but is justifiable if it better achieves the advantages of the present invention.

In particularly advantageous embodiments of the present invention, the stirrer is supported for rotation in the reactor only at its lower end and its drive member is provided at the lower end of the reactor housing. The significant advantage of this type of drive from the lower end is that with the appropriate design of the stirring member there exist no possibilities for the reaction mass to stick to any parts of the stirring member, to be cracked there for example, and thus adversely influence the quality of the charge. A drive member for the stirrer at the upper end of the reactor housing is possible without disadvantages if the reaction mass is not reduced in quality by deposits.

The energy to be spent for the rotary movement of the stirrer is not very great with the low speeds required — up to 60 rpm — particularly since parts of the stirrer are always disposed in the vapor chamber.

Also of particular advantage are embodiments of the invention in which the stirrer is disposed eccentrically in the interior of the reactor. The asymmetries andn turbulences occurring in any case in the movement of the reaction mass are thus advantageously further augmented and the stirring shaft may be disposed not only perfectly perpendicularly below the longitudinal axis of the reactor but also additionally somewhat laterally offset.

A further advantage of the eccentric arrangement of the stirrer axis is that this creates varying distances between the walls and the stirring member. The distance of the stirring member from the wall should be as small as possible in the liquid portion in order to permit all parts to participate in the stirring effect. In the vapor chamber, however, this distance should be greater so that the reactor walls will not be wetted.

Also in order to prevent undesirable deposits, it is advantageous to dispose the input conduit for the reaction material in the area of the liquid chamber. Thus it is impossible for residual quantities of the reaction mass introduced at this point to cake on at any place due to the movement imparted according to the invention. In this respect it has been found to be particularly advantageous to provide the input conduit for the reaction mass in the immediate vicinity of the discharge conduit, i.e. also in the lower region of the liquid chamber.

The embodiments of the present invention described below differ in the structural design of the stirrers. A simple worm conveyor which can be composed substantially of a spiral band is used to mix the reaction mass in the inclined reactor within the liquid chamber as well as to lift it to the vapor chamber from where it drops back into the liquid chamber in the form of films, filaments or veils. The stirring shaft need extend only about half the length of the stirrer if the outermost parts of the worm or spiral are appropriately mounted so that the upper shaft end is always disposed below the liquid level and all parts of the stirrer are wetted at least once by the reaction mass during each full revolution and the reaction mass itself is renewed.

When the stirrer consists of two oppositely moving worms, an upward conveying effect can be produced for the reaction mass in the lower region of the liquid chamber and a downward conveying effect in the upper region. A further improvement of the conveying effect for the worm stirrers results when the stirrer has concentric worms. Then the inner worm may have not only a smaller diameter than the outer worm, moving in the opposite direction and perhaps being made of two parts, it can also be shorter in length than the outer worm.

A further preferred embodiment of a stirrer is formed of four quarter screw threads; anchor stirrer are also possible and advantageous.

One stirrer consisting of a plurality of discs operates according to a recently disclosed principle where the discs are arranged in succession in the direction of the axis of rotation and at an inclination thereto so that two points on the same diameter at the circumference of each disc, each point having the shortest distance from one of the two ends walls of the reactor housing, the points of all discs closer to the one end wall lie on a spiral line which is coaxial with the axis of rotation.

Stirrers with oblique paddles whose longitudinal axes extend radially, or stirrers in the form of blade or crossed blade stirrers, or stirrers with propellers, e.g. propellers with alternatingly different lengths, in principle produce the same advantageous effects with regard to mixing and conveyance of the reaction mass as well as with regard to an increase in the surface area of the reaction mass in the vapor chamber.

It is of significance, for the embodiments of the present invention, that the stirrer may be provided with perforated surface structures which have an advantageous effect on the mixing as well as on the lifting of the reaction mass into the vapor chamber, the return of the mass into the liquid chamber and the evaporation of volatile components.

BRIEF DESCRIPTION OF THE DRAWING

FIGS. 3 to 10 are elevational view of various embodiments of stirrers according to the invention.

DESCRIPTION OF THE PREFERRED EMBODIMENTS

Figure 1:
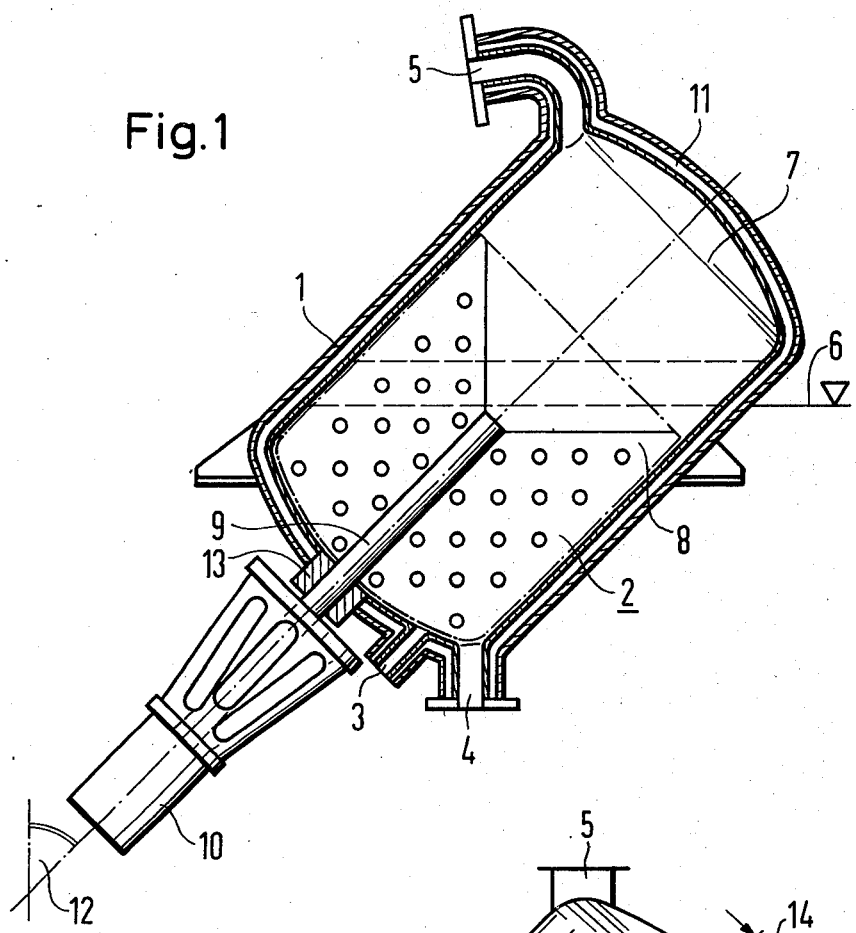
FIG. 1 is an elevational cross-sectional view of one preferred embodiment of an inclined reactor according to the invention.

The reactor shown in FIG. 1 for the production of individual batches of polymers, for example polyesters or polyamides, is arranged with its longitudinal axis inclined at an acute angle 12 with respect to the vertical. The stirrer 2 is disposed in the interior of the reactor and is mounted for rotation about a shaft 9 which extends along the longitudinal axis of the reactor 1.

The monomers are introduced into the interior of reactor 1 through the inlet conduit 3. The reaction mass of a batch is initially above level 6 in the lower, liquid, chamber 8, as shown by the dashed line above line 6, and during the polymerization or polycondensation it drops back to level 6. Drive member 10 rotates stirrer 2 about its axis of rotation and its outermost structural members move at least once through the upper, vapor, chamber 7 during each revolution and dip into the lower, liquid, chamber 8. Thus, the reaction mass has a larger surface area exposed to the reaction conditions so that the volatile components can easily be separated and discharged through the conduit 5 for the gaseous substances. If required the interior of reactor 1 can also be connected to a vacuum source via conduit 5.

Stirrer 2 is designed so one portion thereof is always disposed in the liquid chamber and the remaining portion extends into the vapor chamber and dips into the reaction mass once during every revolution. The stirrer 2 which is rotatably mounted in shaft bearing 13 thus has no parts on which the reaction mass could settle for longer than the period of one revolution without being turned over.

Stirrer 2 (FIG. 1) is composed simply of flat plates disposed diametrically opposite one another. There may be provided two, four or e.g. eight of such plates; each plate is perforated.

The spacing between the outline of the stirrer structure and the interior of the reactor is as small as possible, of the order of several millimeters, in practice within a range from 3 mm to 30 mm.

The reaction mass is heated by means of a heat exchange medium introduced through double jacket 11 and is discharged upon completion of the polymerization or polycondensation through discharge conduit 4 at the lowest point of the lower liquid chamber 8.

Figure 2:
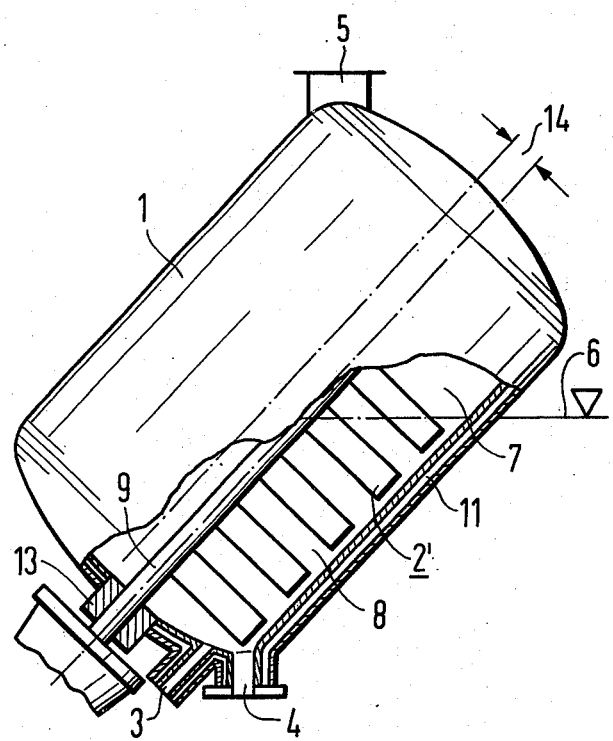
FIG. 2 is a partially cross-sectional elevational view of an inclined reactor with eccentric stirrer according to the invention.

In FIG. 2 parts corresponding to those shown in FIG. 1 bear the same reference numerals. In this embodiment the stirrer 2' is eccentrically disposed in the interior of the reactor 1. The eccentricity 14 is indicated by the two dot-dash lines and may be constituted by an eccentricity in the vertical as well as in the horizontal direction.

The stirrer indicated in FIG. 3 is a simple worm 15 which is fastened to stirrer shaft 9. The radially outermost parts of worm 15 enter into the reaction mass below level 6 during each revolution. The drive for this stirrer and all other stirrers in the various embodiments of the invention is advantageously provided at the lower end but may also be effected from the top end.

The stirrer shown in FIG. 4 is composed of four perforated plates 191 to 194 in the form of quarter screw threads which are each fastened to the stirrer shaft 9 with respective angular offsets of 90°. When this stirrer rotates, the reaction mass is also mixed well and is lifted into the upper vapor chamber 7 where it exposes a large surface area to the reaction conditions. Each of the plates 191–194 extends around one-quarter of the circumference of shaft 9. All four plates have the same direction of twist. This structure thus represents a four-threaded screw, i.e. in a plane normal to shaft 9 there are provided four screw thread sections spaced equidistantly around the circumference of shaft 9. Each of the four screw threads has a length corresponding to one quarter of the thread pitch.

The stirrer shown in FIG. 5 includes a plurality of discs 21a to 21x disposed in succession along the axis of shaft 9. These discs 21a to 21x are not fastened perpendicular to the axis of stirrer shaft 9, but are inclined slightly with respect thereto so that around the periphery of each disc there is one point closest to one axial end of the housing and one point closest to the opposite axial end, the two points being diametrically opposite one another. The discs are angularly offset from one another in such a manner that the set of peripheral points closest to one axial end of the housing define, or lie on, a spiral line which is coaxial to the axis of rotation of stirrer shaft 9. With this type of stirrer the reaction mass will be mixed through particularly well and the exposed surface area of the reaction mass will be enlarged considerably.

The stirrer shown in FIG. 6 is provided with two perforated blades 23 which are fastened in a common plane to shaft 9. Not shown, but likewise possible, are three, four or more stirrer blades 23 which are equispaced about shaft 9.

The embodiment of a stirrer shown in FIG. 7 has a total of three worm structures 16, 17 and 18.

The worms 16 and 17 have the same diameter but oppositely directed pitch and are spaced apart along the axis of shaft 9. That means that worm 16 conveys the reaction mass upwardly and worm 17 downwardly. In addition to the two worms 16 and 17 a further worm 18 is fastened to shaft 9 concentrically with worms 16 and 17, to provide further improved mixing of the reaction mass. The inner worm 18 is shorter than worms 16 and 17 together so that when the stirrer is moved the outline will be approximately as shown in FIG. 1.

The stirrer shown in FIG. 8 is an anchor stirrer 20. Two arms of the anchor are shown, each being perforated and having three radially extending wings leading to the stirrer shaft 9. Here, too, as is the case for the embodiment of FIG. 6, three, four or more wings can be present in anchor 20.

As can also be seen in FIG. 2, the stirrer according to FIG. 9 has paddles 22 whose longitudinal axes extend radially and are fastened to the stirrer shaft 9 so as to be inclined at an angle to the axis of shaft rotation in a manner to constitute crossed blades.

The stirrer shown in FIG. 10 is composed of propellers 24 and 25. Propellers 25 are shorter than propellers 24 and are disposed between two longer propellers 24.

It is significant for the stirrers that the surface structures are provided with holes 26. In this way the mixing of the reaction mass is not only improved and facilitated but a further increase in the surface area is obtained which has an advantageous effect on the evaporation of the volatile components from the reaction mass. All types of stirrers may be arranged centrically as well as eccentrically in the interior of the reactor.

Whereas in the known horizontal reactors an eccentric stirrer forms an upper vapor chamber, the present invention employs the eccentric stirrer mainly to improve the mixing of the reaction mass.

It will be understood that the above description of the present invention is susceptible to various modifications, changes and adaptations, and the same are intended to be comprehended within the meaning and range of equivalents of the appended claims.

I claim:

1. In a method for subjecting a reaction mass to a polymerization or polycondensation reaction in a reactor having a cylindrical interior and provided with a stirrer mounted within the reactor to be rotatable about an axis which extends in the direction of the longitudinal axis of the reactor interior, the reactor being further provided with a reaction mass inlet, a reaction mass discharge conduit, a conduit for removal of gaseous substances evaporating during the reaction, and a heating device, the improvement comprising: orienting the reactor in a manner to incline its longitudinal axis at an acute angle to the vertical and to cause the interior of the reactor to present an upper region in communication with the conduit for removal of gaseous substances and a lower region in communication with the reaction mass discharge conduit; delivering into the reactor interior a quantity of reaction mass sufficient to fill the lower region to a height such that the upper surface of the reaction mass in the reactor has the form of an ellipse bounded by the cylindrical interior of the reactor, with the stirrer being constructed such that at least part thereof dips into the reaction mass and emerges therefrom during each revolution of the stirrer; and rotating the stirrer while maintaining the reaction mass under conditions sufficient to effect the reaction.

2. A method as defined in claim 1 wherein said step of orienting is carried out to incline the longitudinal axis of the reactor at an angle of between 10° and 80° to the vertical.

3. A method as defined in claim 2 wherein said step or orienting is carried out to incline the longitudinal axis of the reactor at an angle of between 30° and 60° to the vertical.

4. A method as defined in claim 1 wherein said step of orienting includes varying the inclination of the longitudinal axis of the reactor during the course of a reaction.

* * * * *